US008973435B2

(12) United States Patent
Preston et al.

(10) Patent No.: US 8,973,435 B2
(45) Date of Patent: Mar. 10, 2015

(54) ESPRESSO MACHINE METHOD AND APPARATUS

(75) Inventors: Adam Preston, Coogee (AU); Con Psarologos, Bardwell Valley (AU)

(73) Assignee: Breville Pty Limited, Botany, NSW (AU)

( * ) Notice: Subject to any disclaimer, the term of this patent is extended or adjusted under 35 U.S.C. 154(b) by 11 days.

(21) Appl. No.: 13/696,803

(22) PCT Filed: May 6, 2011

(86) PCT No.: PCT/AU2011/000526
§ 371 (c)(1),
(2), (4) Date: Nov. 8, 2012

(87) PCT Pub. No.: WO2011/140582
PCT Pub. Date: Nov. 17, 2011

(65) Prior Publication Data
US 2013/0068012 A1 Mar. 21, 2013

(30) Foreign Application Priority Data

May 11, 2010 (AU) ................................. 2010901976

(51) Int. Cl.
*G01F 5/00* (2006.01)
*A47J 31/46* (2006.01)
*A47J 31/52* (2006.01)

(52) U.S. Cl.
CPC . *A47J 31/46* (2013.01); *A47J 31/52* (2013.01)
USPC .................. 73/202; 99/302 R; 99/280; 99/283

(58) Field of Classification Search
CPC .......... A47J 31/057; A47J 31/56; A47J 31/52

USPC ........................... 73/202; 99/302 R, 280, 283
See application file for complete search history.

(56) References Cited

U.S. PATENT DOCUMENTS

| 4,124,332 | A | * | 11/1978 | Nishijyo | 417/26 |
| 4,925,096 | A | * | 5/1990 | Gill | 239/10 |
| 4,994,984 | A | * | 2/1991 | Massimo | 702/46 |
| 5,901,636 | A | * | 5/1999 | Witziers et al. | 99/283 |
| 5,904,126 | A | * | 5/1999 | McKay et al. | 417/43 |
| 6,942,470 | B1 | * | 9/2005 | Versini | 417/417 |
| 7,565,861 | B2 | * | 7/2009 | Blanc | 99/302 R |
| 2005/0236429 | A1 | * | 10/2005 | Duck et al. | 222/137 |
| 2006/0249030 | A1 | * | 11/2006 | Bienvenu et al. | 99/291 |
| 2007/0169546 | A1 | * | 7/2007 | Zalite et al. | 73/202 |
| 2008/0190297 | A1 | * | 8/2008 | Gussmann et al. | 99/280 |
| 2009/0151573 | A1 | * | 6/2009 | Tonelli et al. | 99/280 |
| 2010/0005903 | A1 | * | 1/2010 | Beavis | 73/290 R |

(Continued)

FOREIGN PATENT DOCUMENTS

GB     2448891 A * 11/2008 ............. A47J 31/52

*Primary Examiner* — Lisa Caputo
*Assistant Examiner* — Philip Cotey
(74) *Attorney, Agent, or Firm* — Molins & Co Pty Ltd

(57) ABSTRACT

A method and apparatus for measuring a resultant flow delivered by a pump coupled to an over pressure valve, the method comprising the steps of: measuring, using a first flow meter, feed flow to the pump; measuring, using a second flow meter, return flow from the over pressure valve; and calculating resultant flow, at least in part, by subtracting measured return flow from measured feed flow. A pump power modification module can further modifying the pump output pressure to enable pressure profiling.

17 Claims, 6 Drawing Sheets

(56) References Cited

U.S. PATENT DOCUMENTS

| | | | |
|---|---|---|---|
| 2010/0011966 A1* | 1/2010 | Nielsen et al. | 99/302 R |
| 2010/0107886 A1* | 5/2010 | Xiao et al. | 99/281 |
| 2011/0094389 A1* | 4/2011 | Coccia | 99/280 |
| 2011/0094390 A1* | 4/2011 | Bianchi et al. | 99/281 |

* cited by examiner

ESPRESSO MACHINE METHOD AND APPARATUS

FIELD OF THE INVENTION

The present invention relates to fluid boilers and in particular to regulated control of fluid boilers.

The invention has been developed primarily for use as a controlled boiler method, and apparatus of an espresso machine and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Known espresso machine control both the pressure and dose of water delivered in producing a shot of espresso coffee. It will be appreciated that the pressure is typically set to between nine and ten bar. The dose is typically about 30 mL, and is delivered in between twenty to forty seconds.

A pre-infusion stage has been used to wet the coffee grinds to allow expansion within a filter basket, thereby assisting in trapping fine grinds and restricting water from tracking though the filter. To enable wetting without forcing water though the coffee grinds, the water delivered in this pre-infusion stage usually has a pressure between one to five bar.

There is a need for an efficient method and apparatus for providing a dose having a regulated pressure and volume. There is also a need to provide an efficient method and apparatus for enabling an espresso machine water pumps to deliver a controlled low pressure pre-infusion.

OBJECT OF THE INVENTION

It is an object of the present invention to overcome or ameliorate at least one of the disadvantages of the prior art, or to provide a useful alternative.

It is an object of the invention in a preferred form to provide an espresso machine that can provide a dose having a regulated pressure and volume.

It is an object of the invention in a preferred form to provide an espresso machine that can provide a controlled low pressure pre-infusion.

SUMMARY OF THE INVENTION

According to an aspect of the invention there is provided a flow measurement apparatus for measuring a resultant flow delivered by a pump coupled to an over pressure valve, the apparatus comprising:
- a first flow meter for measuring feed flow to the pump;
- a second flow meter for measuring return flow from the over pressure valve; and
- wherein a resultant flow delivered by a pump can be determined by subtracting measured return flow from measured feed flow.

Preferably, resultant flow can be determined (or calculated) in real time, and used to stop the operation of the pump when a suitable dose has been delivered.

According to an aspect of the invention there is provided an espresso machine comprising a flow measurement apparatus as herein disclosed, for measuring a shot dose delivered by a pump coupled to an over pressure valve. Preferably, the espresso machine further comprises a pump power modification module as herein disclosed, for providing pre-infusion.

According to an aspect of the invention there is provided a pump power modification module operatively associated with a pump. Preferably, the pump power modification module enables providing a pressure profiling to the flow delivered by a pump. More preferably, the pump power modification module enables providing pre-infusion.

According to an aspect of the invention there is provided an espresso machine comprising a pump power modification module as herein disclosed, for providing pre-infusion. Preferably, the espresso machine further comprises a flow measurement apparatus as herein disclosed, for measuring a shot dose delivered by a pump coupled to an over pressure valve.

Preferably, the pump power modification module can enable pressure profiling during an espresso production cycle. More preferably, the pressure profile can be preset or user configurable. Most preferably, the pressure profile can take the form of power-time profile indicative of electrical power delivered to a respective pump.

According to an aspect of the invention there is provided a method of flow measurement for measuring a resultant flow delivered by a pump coupled to an over pressure valve, the method comprising the steps of:
- (a) measuring, using a first flow meter, feed flow to the pump;
- (b) measuring, using a second flow meter, return flow from the over pressure valve; and
- (c) calculating resultant flow, at least in part, by subtracting measured return flow from measured feed flow.

Preferably, calculating resultant flow can be performed in real time, and used to stop the operation of the pump when a suitable dose has been delivered.

According to an aspect of the invention there is provided an espresso machine comprising a processor device adapted to perform a method of flow measurement as herein disclosed, for measuring a shot dose delivered by a pump coupled to an over pressure valve.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

It will be appreciated that espresso machines are widely used in making drink beverages. While Espresso machines are available in commercial and private use ranges, they share similar working principles.

Shots of espresso are typically brewed by the pressurised penetration of hot water through densely-packed finely-ground coffee. This forced diffusion of water through coffee grounds, results in the production of espresso coffee. Quality, flavour and taste of any resultant espresso coffee are influenced by a plurality of factors, which include texture of the ground coffee, the intensity of ground coffee packing, and temperature and pressure of the water used. By maintaining these factors in appropriate proportions, it is possible to produce substantially consistent shots of espresso.

Figure 1:
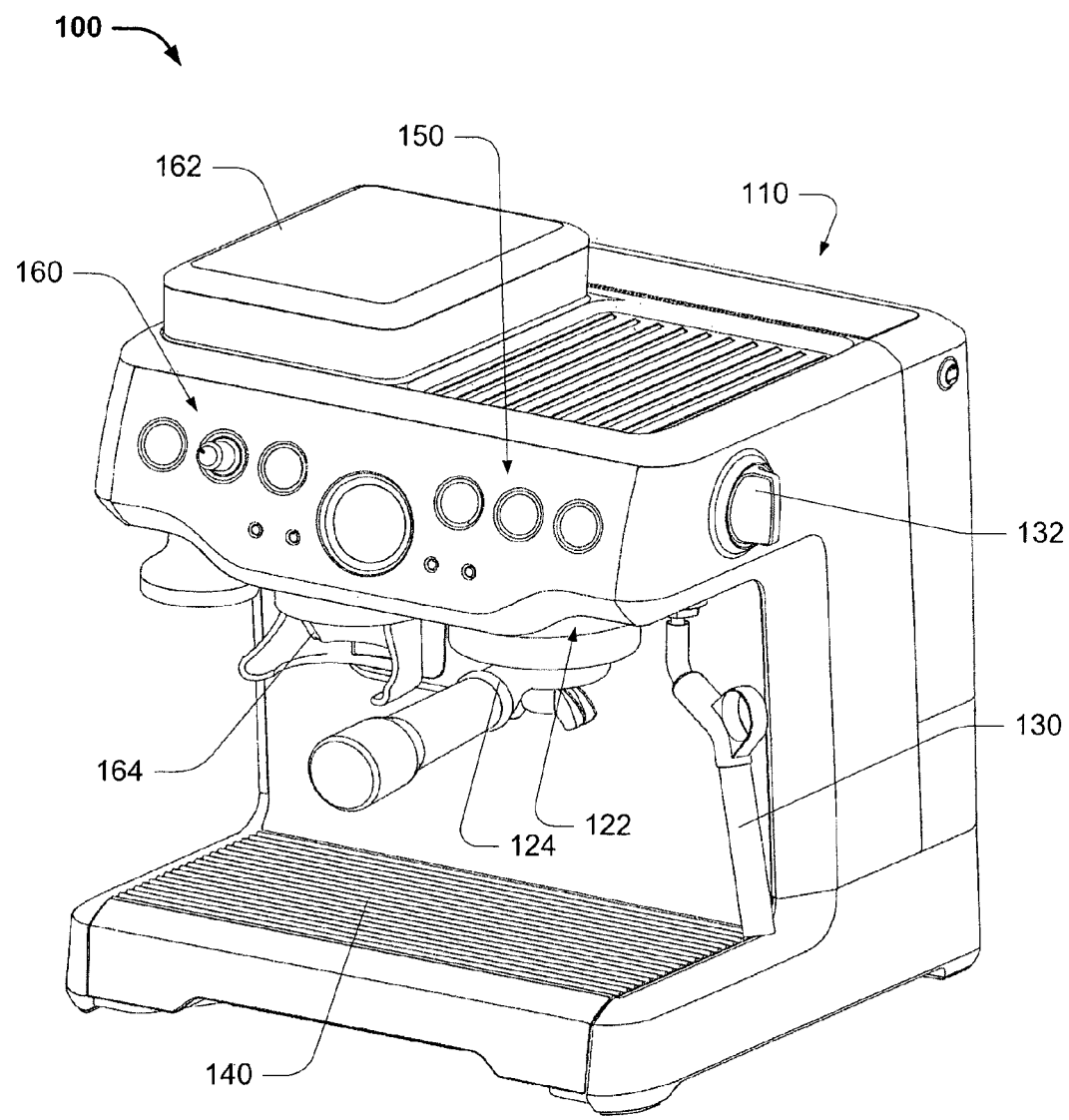
FIG. 1 is a perspective view of an espresso machine according to the invention.

Pump based espresso machines rely, at least in part, upon the bar pressure of the pump to make a suitable espresso coffee. Referring to FIG. 1, these pump based coffee machines 100 can include: a water reservoir 110 (typically internal), shower head 122, and filter basket 124 (for holding the coffee grounds). A steam wand 130 and steam valve 132 may be included for frothing milk. A drip tray 140 is typically provided for collecting spillages and excess water. A series of user control inputs 150 can be provided for setting at least some of the parameters (or factors) associated with producing espresso coffee.

It will be appreciated that some espresso machines have an integrated coffee grinder 160. This can include a hopper 162 for feeding coffee beans to a grinder and an output 164 for filling the filter basket (when provided there below) with coffee grounds.

With water in the water reservoir, and the coffee grounds in the filter basket, water is heated and pumped to the shower head 122. Upon heated water reaching the shower head 122, a forced diffusion of water through coffee grounds in the filter basket occurs, resulting in the production of espresso coffee.

Figure 2:
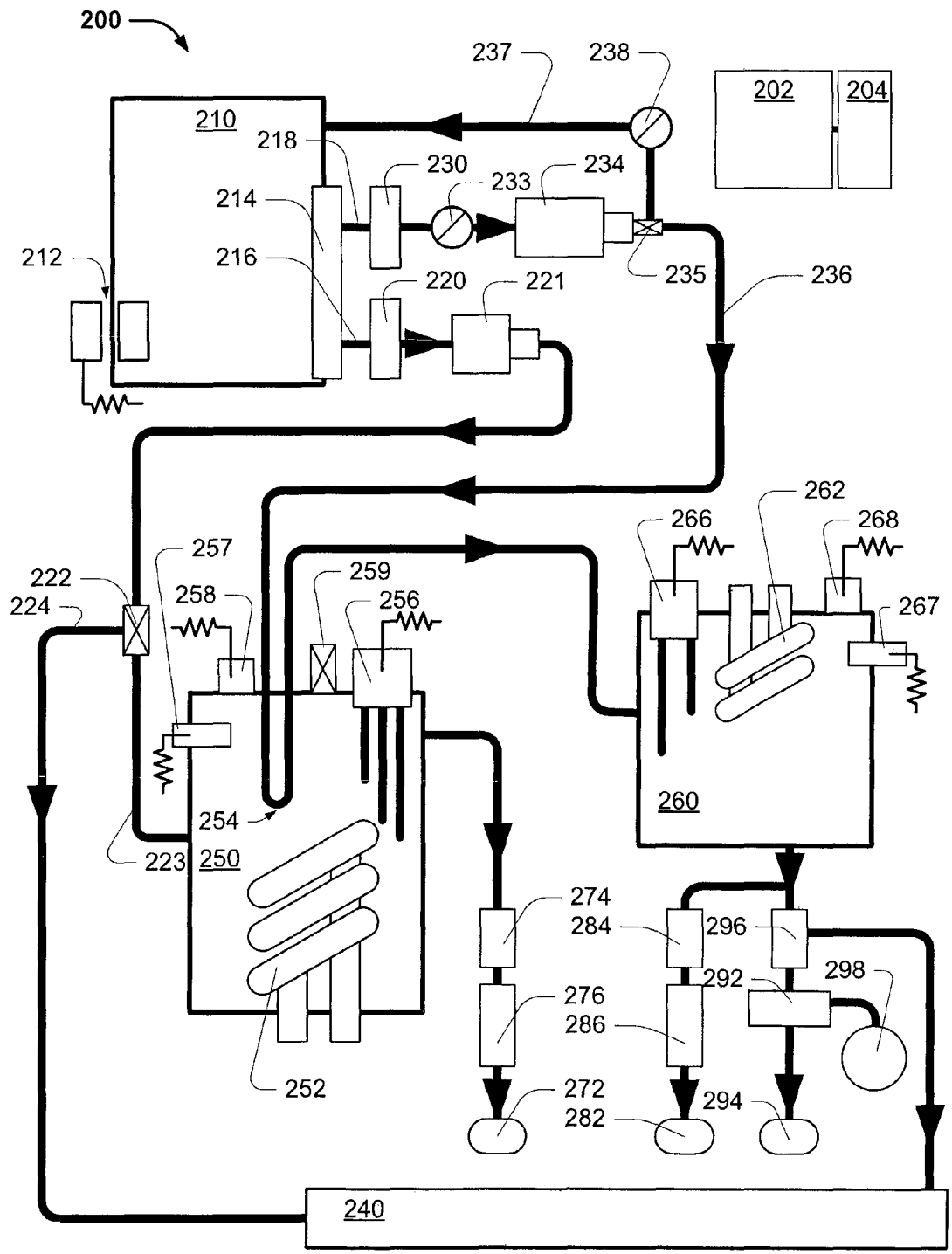
FIG. 2 is a schematic view of an espresso machine according to the invention.

FIG. 2 shows an embodiment schematic for an espresso coffee machine 200. This coffee machine comprises a water reservoir 210, having a reed switch tank level sensor 212. Egress from the water reservoir includes passing though a filter 214, in fluid communications with two egress paths 216 and 218.

In this embodiment, a first egress path 216 is for communicating water from the reservoir 210 to a steam boiler 250. This egress path includes a protection filter 220 which communicates water to a pump 221 that supplies water at a predetermined pressure. A safety relief valve 222 is included to limit the water pressure provided to the steam boiler 250. In the event of over pressure occurring on this fluid line, the relief valve provides water to the drip tray 240 using fluid line 224. By way of example, the pump 221 provides water with about three bar pressure to the steam boiler 250 (using fluid line 223). For steam system, the pump is supplied the water at approx. 3 bar to refill the boiler. The safety relief valve 222 is set to activate at a higher pressure, and is used for protection.

By way of example, the steam boiler 250 is used to convert water provided by fluid line 223 to steam. The boiler includes a heating element 252, a water level probe 256, a thermistor 257, a thermal fuse and thermostat 258; and vacuum breather valve 259. In this example, the steam boiler is a 0.80 litre boiler. By way of example only, this boiler 250 can be constructed from any one or more materials in a set comprising diecast-aluminium (preferably teflon-lined), stainless steel, or brass. The heating element 252 is preferably an immersed 1000 watt heater element. By way of example only, this heating element can be constructed from any one or more materials in a set comprising stainless steel and Incololy. It would be appreciated that the heater element can have alternative power ratings that are suitable for creating steam within the boiler. The water level probe 256 preferably uses three probes to monitor water level and is substantially comprised of stainless steel probes. By way of example only, the thermistor 257 has a maximum temperature rating of about 200 degrees Celsius.

By way of example, egress steam 272 from the steam boiler 250 is released from a ball valve 274 though a steam wand 276. Preferably, the ball valve has a maximum temperature rating of about 150 degrees Celsius, a nominal working pressure of about two bar and a maximum pressure rating of about eight bar. In this embodiment, a second water egress path 218 communicates water from the water tank 210 to a coffee boiler 260. This egress path includes a protection filter 230, a first flow meter 233 and a pump 234. The pump 234 further includes an over pressure (or safety relief) valve 235. This over pressure valve 235 is adapted to limit the water pressure provided to line 236, typically to between nine bar and ten bar. The over pressure valve 235 is typically set to a pressure set-point, typically about ten bar, such that when water pressure exceeds this set-point a portion of the water is fed back through a return line 237 to the reservoir 210, thereby maintaining a pressure set-point. The amount of water fed back through a return line 237 can be measured by a second flow meter 238. The main egress path 236 proceeds through the steam boiler 250 via a heat exchanger 254 and then to the coffee boiler 260.

By way of example, the coffee boiler 260 includes a heating element 262, a water level probe 266, a thermistor 267 and a thermal fuse and thermostat 268. In this example, the coffee boiler 260 is a 0.30 litre boiler. By way of example only, this boiler 260 can be constructed from any one or more materials in a set comprising diecast-aluminium (preferably teflon-lined), stainless steel, or brass. By way of example only, the heating element 262 is an immersed stainless steel 600 watt heating element. The water level probe 266 preferably uses two probes to monitor water level and is substantially comprised of stainless steel probes. By way of example only, the thermistor 267 has a maximum temperature rating of about 150 degrees Celsius.

By way of example, egress from the coffee boiler is used to provide hot water 282, via a needle valve 284, though a hot water wand 286. In this example, the needle valve 282 preferably has a maximum temperature rating of about 120 degrees Celsius and a working pressure of about fifteen bar.

By way of example, egress from the coffee boiler is also used to provide hot water to a coffee showerhead 292 for providing coffee 294. A solenoid 296 releases hot water to the showerhead 292 for making coffee. The showerhead 294 further has a pressure gauge 298 for displaying the pressure of hot water provided by the coffee boiler. By way of example only, the solenoid 296 has a maximum working pressure of about sixteen bar, and a maximum fluid temperature of about 160 degrees Celsius. By way of example only, the solenoid 296 body can be constructed from any one or more materials in a set comprising stainless steel and brass. Different protective coatings can be applied to the solenoid, including nickel-plating.

It will be appreciated that, by way of example only, the fluid lines can include one or more tubing element selected from the set comprising stainless steel tubing, Teflon tubing, and silicon tubing.

In an embodiment, pumps 221 and 234 can include vibration (displacement) pumps or rotation pumps. It will be appreciated that alternative pump technologies can be used.

It will be appreciated that vibration pumps typically produce around fifteen bar to eighteen bar unregulated pressure, which is typically considered too high for espresso extraction. To regulate the pressure, a fixed or variable over pressure valve can be installed. However, with such a valve installed, known method of measuring the dose includes having a flow meter located proximal to the shower head. It will be appreciated that any installation in the flow proximal to the shower head requires that the over pressure valve be suited to operation in a high temperature and a high pressure environment. The construction and operation of over-pressure valves will be discussed in more detail below.

In an embodiment, the apparatus 200 includes a processor 202 for receiving inputs from user interface 204 and water level probes, thermistors, and thermal fuse/thermostats. The processor is also used to control/activate heating elements and pumps.

In an embodiment, a pair of flow meters are used, the first flow meter 230 to measure the feed flow to the pump and the second flow meter 237 to measure return flow from an over pressure valve 235. In this arrangement, the resultant flow delivered to the coffee boiler 260 (and therefore to the shower head 296) can be calculated by subtracting the return flow from the feed flow. By calculating resultant flow over a time period of coffee production, a dose measure can be determined. It will be appreciated that this calculation can be performed in real time, and used to stop the pump when a suitable dose has been delivered through the shower head.

In an embodiment, a flow measurement apparatus, for measuring a resultant flow delivered by a pump coupled to an over pressure valve, the apparatus comprising:
  a first flow meter for measuring feed flow to the pump;
  a second flow meter for measuring return flow from the over pressure; and
  wherein a resultant flow delivered by a pump can be determined by subtracting measured return flow from measured feed flow.

Figure 3:
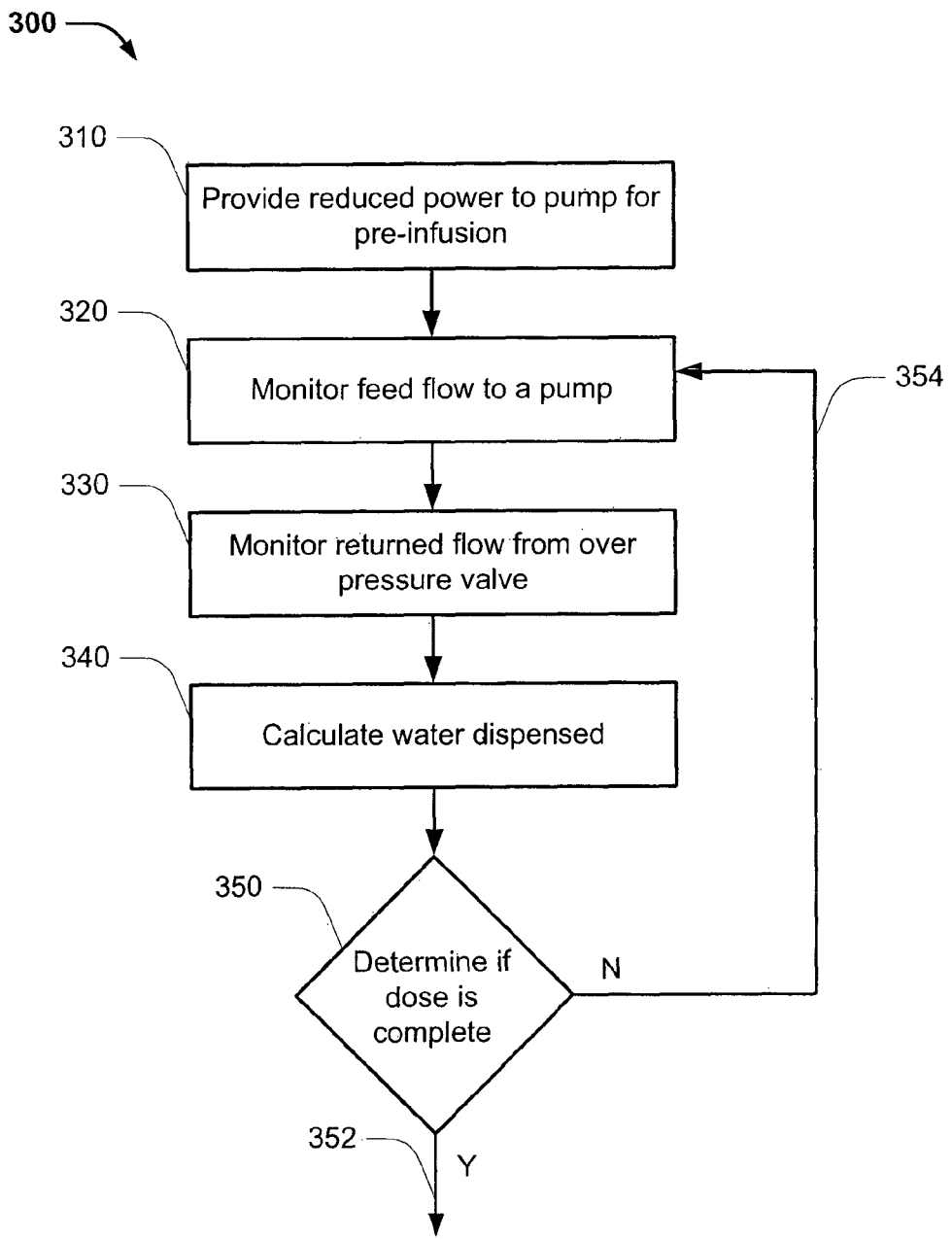
FIG. 3 is a flow chart of a method of controlling an espresso machine according to the invention.

Referring to FIG. 3, a method 300 of flow measurement for measuring a resultant flow delivered by a pump coupled to an over pressure valve, the method comprising the steps of:
  STEP 320: monitoring (or measuring), using a first flow meter, feed flow to the pump;
  STEP 330: monitoring (or measuring), using a second flow meter, return flow from the over pressure valve; and
  STEP 340: calculating resultant flow, at least in part, by subtracting measured return flow from measured feed flow.

It will be appreciated that this calculation can be performed in real time, and used to stop the pump (STEP 350) when a suitable dose has been delivered through the shower head. The pressure, dose amount, duration can be preset or user configurable (using user interface 204).

A pre-infusion stage is often initiated to wet the coffee grinds to allow expansion within a filter basket, thereby assisting in trapping fine grinds and restricting water tracking though the filter. To enable wetting without forcing water though the coffee grinds, the water delivered in this pre-infusion stage is usually provided at a pressure of about three bar. However, it will be appreciated that pre-infusion pressure can range from 1 to 5 bar.

In this embodiment, the pump 230 can be controlled to provide a lower (or reduced) pressure pre-infusion stage. This can be achieved by reducing the electrical power supplied to the pump during this stage. Typically a power modification module, as discussed in more detail below, can be utilised to enable processor control of electrical power supplied to the pump. Preferably, during the pre-infusion stage, the electrical power supplied to the pump enables the pump to produce a lower that normal pressure. The water flowing during the pre-infusion stage may (or may not) be counted toward a subsequent dose has been delivered through the shower head.

It will be appreciated that power control and flow measurement can be combined to enable measurement of a resultant pre-infusion dose. In an embodiment, the pressure, dose amount, duration can be preset or user configurable (using user interface 204).

In an alternative embodiment, where the system pressure is not measures and the pressure may not be configurable to a unit value, a percentage of the MAX pump pressure available can be configured. For example, a pressure profile could comprise 30% pressure for 5 secs, then 100% pressure for 20 secs, then 70% pressure for a final 5 secs. Similarly, in another example embodiment, the system may exercise a method of volume output configured such that the delivery would entail a 5 ml at 30%, a 20 ml at 100%, and a 5 ml at 70% distribution.

It will be appreciated that a power modification module can further enable pressure profiling during an espresso production cycle. A pressure profile can be preset or user configurable (using user interface 204). Pressure profiling can take the form of power-time profile indicative of electrical power delivered to a respective pump.

It will be appreciated that the illustrated apparatus discloses an espresso machine that can provide a dose having a regulated pressure and volume.

It will be appreciated that the illustrated apparatus further discloses an espresso machine that can provide a controlled low pressure pre-infusion.

Over Pressure Valve

An over pressure Valve (OPV), also known as an expansion valve, can be used to regulate water flow pressure within an espresso machine. The regulate pressure can be fixed or adjusted. For an espresso machine, an over pressure valve can regulate pressure down to between nine bar to ten bar on many vibration pump based machines.

Figure 4:
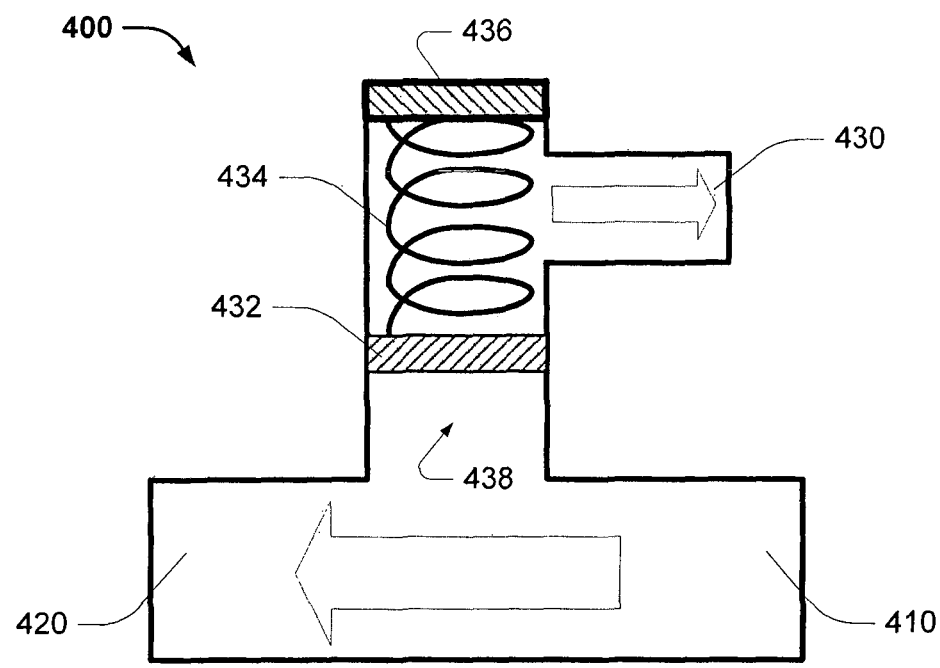
FIG. 4 is a schematic view of an over pressure valve of FIG. 2.

Referring to FIG. 4, an over pressure valve 400 comprises an ingress aperture 410 and an egress aperture 420. An over pressure aperture 430 is included for releasing water to substantially maintain a pressure set-point. A release seal 432, typically in the form of a ball, rubber pad on brass piston or similar, is biased to a closed position by a spring 434 (the tension on the spring can be adjusted 436) against an exit aperture 438. When pressure exceeds in the set-point, the release seal 432 opens allowing water to flow toward the over pressure aperture 430.

The exit aperture is in fluid communication with the over pressure aperture, typically for routing excess water back to the tank.

It will be appreciated that alternative over pressure valves are adapted to be fixed to a 'T' piece, wherein the 'T' piece defines an ingress aperture and an egress aperture. Flow rate capability is typically determined by the size of the over pressure valve.

Power Modification

Figure 6A:
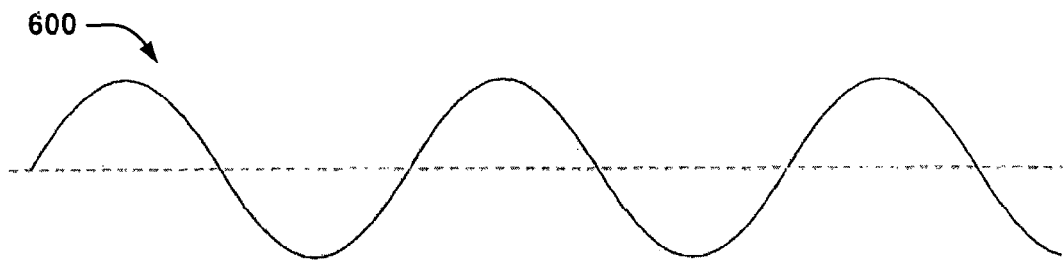
FIG. 6A is a waveform plot power supply signal.

Phase controlled power modification is a method of providing alternating current power to a load only during periods of an alternating current power cycle. FIG. 6A shows a sine wave 600 indicative of alternating current power (voltage or current). Each time the line equals the neutral or ground line, a 'Zero Crossing' occurs.

Circuit diagrams power modification is provided by Motorola data sheet for MOC30xx variants. It has applicability to inductive and resistive loads.

Figure 5A:
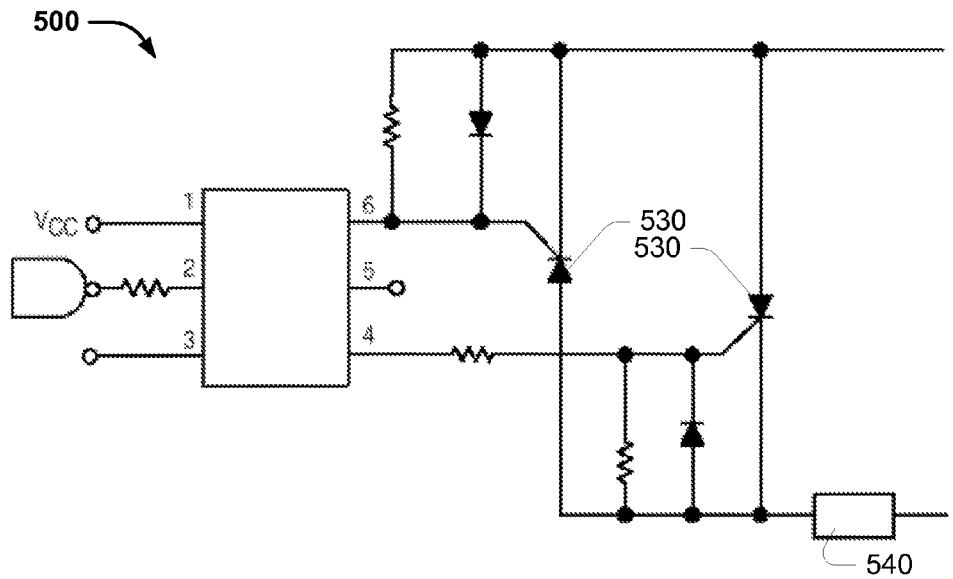
FIG. 5A is a schematic view of a circuit used to modify power suppled to a pump, shown using a silicon controlled rectifier (SCR)

FIG. 5A shows a schematic view of a circuit 500 used to modify power suppled to a pump, shown using silicon controlled rectifier (SCR) 530;

It will be appreciated that a silicon controlled rectifier (SCR) is typically considered as a device which is either on or off. Once turned on, it will only turn off when there is no current flowing through it. The gate requires a small current to switch the SCR on. An SCR will only conduct current one way, so if the current changes polarity, it will turn off, since it won't allow any current to flow.

Figure 5B:
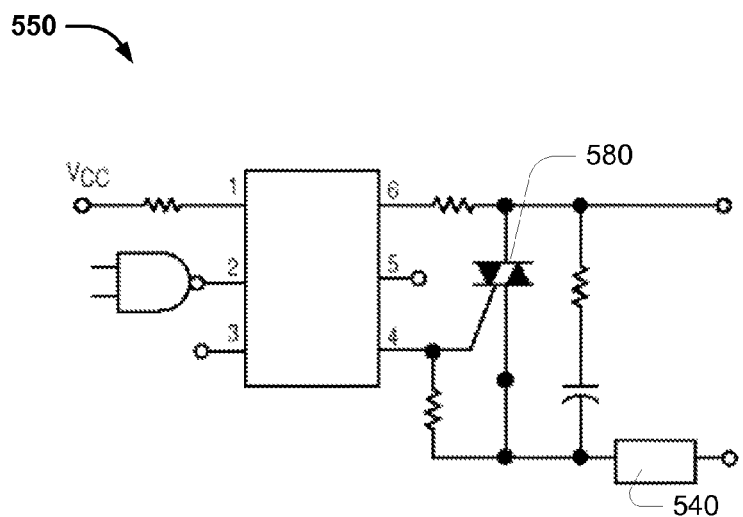
FIG. 5B is a schematic view of a circuit used to modify power suppled to a pump, shown using a triode for alternating current (TRIAC)

FIG. 5B shows a schematic view of a circuit 550 used to modify power suppled to a pump, shown using a triode for alternating current (TRIAC) 580.

It will be appreciated that a TRIAC schematically resembles two SCRs back to back, with only one gate terminal from one of the anodes. This allows AC operation, but every time the current changes polarity the TRIAC turn off (unless the gate is held high).

Phase Control enables only portions of the AC cycle to be coupled to the load 540. This can be performed by a TRIAC, or two back to back SCRs.

It will be appreciated that alternating current sources have two zero crossing every cycle, in which no current should be flowing. In North America the frequency of zero crossings is about 120 times a second, while in Europe the frequency of zero crossings is about 100 times a second.

Figure 6B:
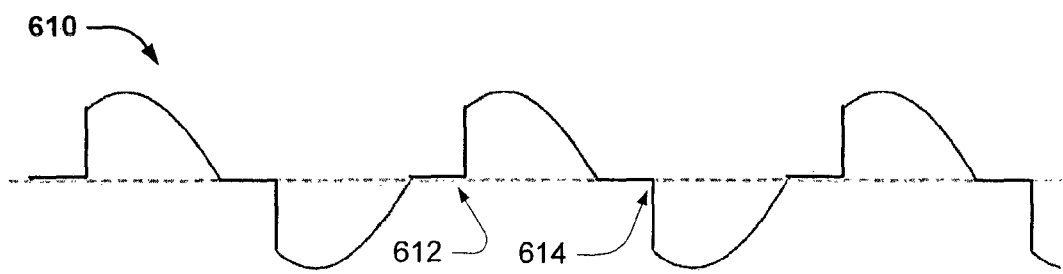
FIG. 6B is a waveform plot of a modification to the power supply signal of FIG. 6A.

As the TRIAC turn off at each zero crossing, if we want less power to be delivered, the TRIAC can be turned on a period after a zero crossing, for example at time 612 and time 614, as shown in FIG. 6B.

Figure 6C:
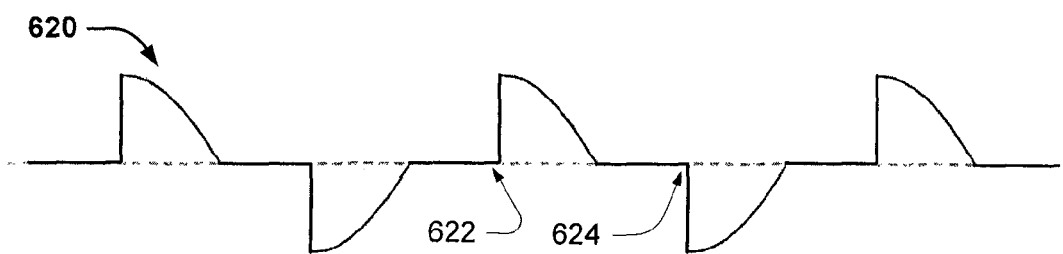
FIG. 6C is a waveform plot of a modification to the power supply signal of FIG. 6A.
Figure 6D:
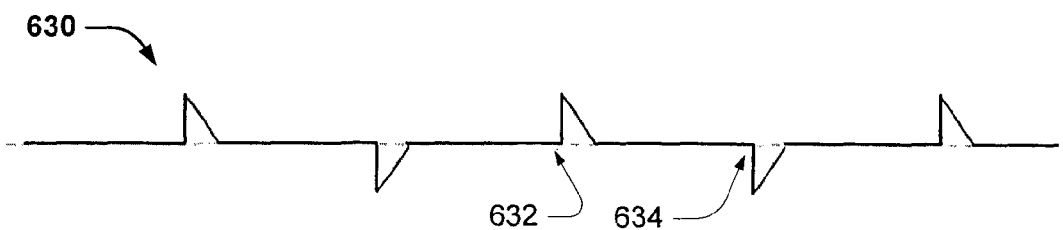
FIG. 6D is a waveform plot of a modification to the power supply signal of FIG. 6A.

Referring to FIG. 6C, if half the power is required, the TRIAC can be enabled at the midpoint between each zero-crossing (time 622 and time 624). Referring to FIG. 6D, by activating the TRIAC just prior to each zero crossing (time 632 and time 634) less than half the power can be provided.

Interpretation

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods, described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment", means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

The claims defining the invention are as follows:

1. A coffee making apparatus including:
    a vibration or displacement pump for delivering fluid flow;
    a power modification module controlling the electrical power applied to the pump for modifying output pressure of the pump output, the power modification module modifies alternating current power supplied to the pump during a phase of an alternating current power cycle; wherein phase control enables only portions of the alternating current cycle to be supplied to the pump for modifying output pressure of the pump output;
    a user interface coupled to the power modification module for user configuration of a power profile of a dose production cycle, the power profile being indicative of electrical power delivered to the pump over a dose production cycle;
    wherein the power modification module controls the pump output according to the user configured power profile.

2. An apparatus according to claim 1, wherein the power modification module uses phase control of an alternating current power supply to enables only portions of the alternating current cycle to be coupled to the pump, thereby to control output pressure of the pump output.

3. An apparatus according to claim 2, wherein controlling the pump output pressure further enables pressure profiling during a dose production cycle.

4. An apparatus according to claim 3, wherein the pressure profiling is in the form of a power to time profile indicative of electrical power delivered to a respective pump.

5. An apparatus according to claim 3, wherein the pressure profiling is in the form of a power to dose flow profile indicative of electrical power delivered to a respective pump.

6. An apparatus according to claim 1, wherein the power modification module controls the pump output to provides a pre-infusion fluid dose at a predetermined pre-infusion pressure; the pre-infusion pressure being less than the normal output pressure of the pump output.

7. An apparatus according to claim 1, wherein the a user interface receives user input power profile that is indicative of pump output pressure as a function of time for the dose production cycle; the wherein the power modification module controls the pump output to according to the user configured power profile.

8. An apparatus according to claim 1, wherein the a user interface receives user input power profile that is indicative of pump output pressure as a function of dose delivered for the dose production cycle; the wherein the power modification module controls the pump output to according to the user configured power profile.

9. A coffee making apparatus, the apparatus providing pre-infusion, the apparatus comprising:
    a vibration pump for delivering fluid flow from a fluid source;
    a power modification module that modifies alternating current power supplied to the pump during phase of an alternating current power cycle; wherein phase control of enables only portions of the alternating current cycle to be supplied to the pump for modifying output pressure of the pump output;
    a user interface coupled to the power modification module for configuring a dose production cycle comprising a pre-infusion stage and an extraction stage;
    wherein the power modification module provides, using the pump output, a pre-infusion fluid dose at a predetermined pre-infusion pressure; wherein the pre-infusion pressure is less than the maximum pressure produced by the pump;
    wherein the power modification module provides, using the pump output, an extraction fluid dose after the pre-infusion fluid dose; the extraction fluid dose being provided at a predetermined pressure greater than the predetermined pre-infusion pressure.

10. The apparatus according to claim 9, wherein pre-infusion pressure is less than the normal output pressure of the pump output.

11. The apparatus according to claim 9, wherein pre-infusion pressure is in the range from 1 to 5 bar.

12. The apparatus according to claim 9, wherein the-pre infusion pump output pressure is user defined through the user interface.

13. The apparatus according to clam 9, wherein modifying the pump output pressure further enables pressure profiling during the dose production cycle.

14. The apparatus according to claim 12, wherein the pump output pressure profile comprises a plurality of pressure levels, each pressure levels being for a respective duration based on time.

15. The apparatus according to claim 12, wherein the pump output pressure profile comprises a plurality of pressure levels, each pressure levels being for a respective duration based on a measured dose flow volume.

16. The apparatus according to claim 12, wherein the pump output pressure profile is user defined through the user interface.

17. The apparatus according to claim 12, wherein the coffee making apparatus provides a dose flow having regulated pressure and volume.

* * * * *